Figure 1:
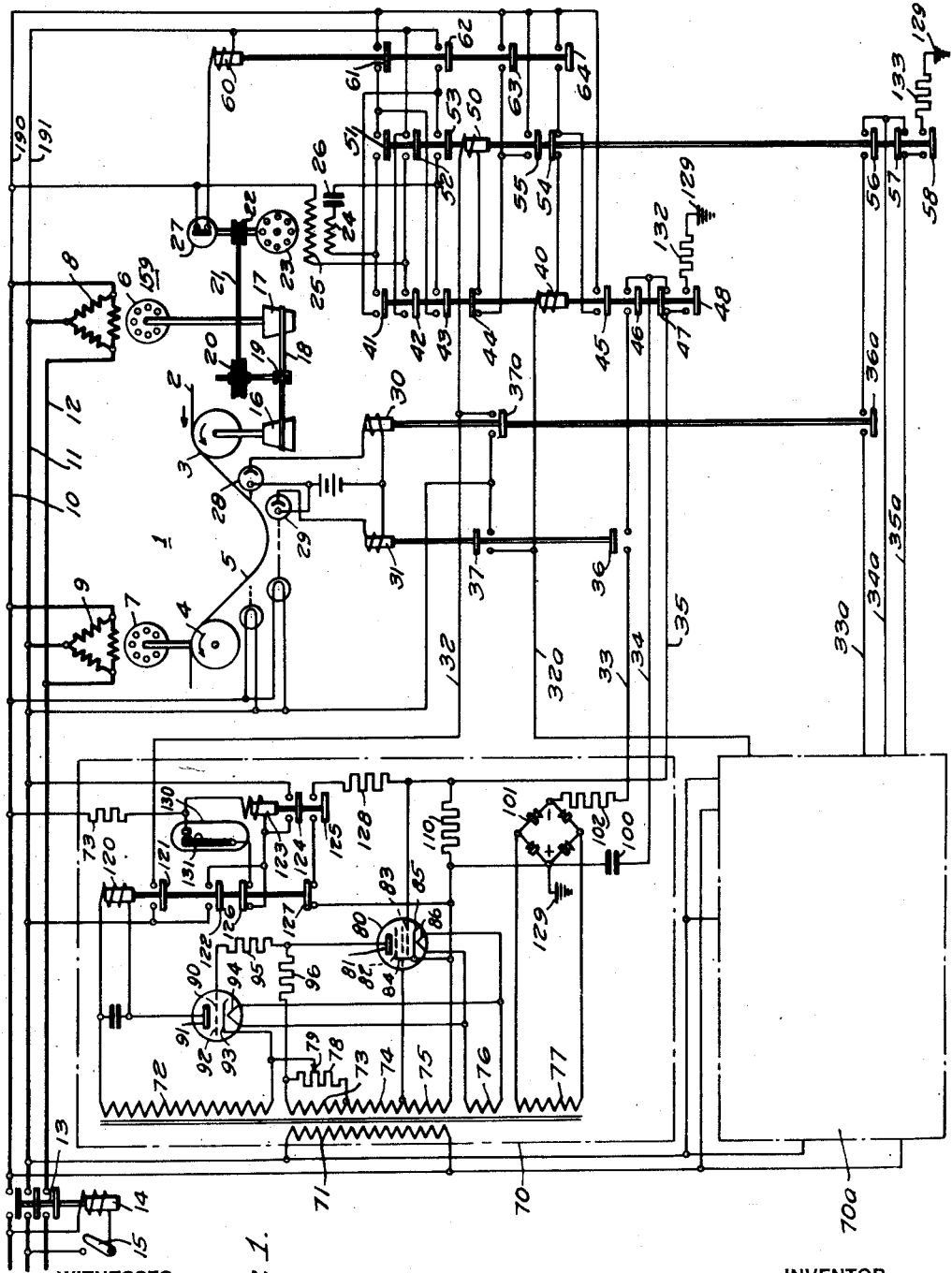

Jan. 15, 1946. W. I. BENDZ 2,393,015
ELECTRONIC DIFFERENTIAL TIMER
Filed March 7, 1942  2 Sheets-Sheet 1

WITNESSES:

INVENTOR
Waldemar I. Bendz.
BY
Paul E. Friedemann
ATTORNEY

Jan. 15, 1946. W. I. BENDZ 2,393,015
ELECTRONIC DIFFERENTIAL TIMER
Filed March 7, 1942 2 Sheets-Sheet 2

WITNESSES:
E. A. McClaskey
W. I. Young

INVENTOR
Waldemar I. Bendz.
BY
Paul E. Friedemann
ATTORNEY

Patented Jan. 15, 1946

2,393,015

UNITED STATES PATENT OFFICE 2,393,015

ELECTRONIC DIFFERENTIAL TIMER

Waldemar I. Bendz, Arlington, Mass., assignor to Westinghouse Electric Corporation, East Pittsburgh, Pa., a corporation of Pennsylvania Application March 7, 1942, Serial No. 433,784

9 Claims. (Cl. 271—2.3)

This invention relates, as indicated, to an electronic differential timer and, more particularly, to a control system for regulating the operation of a differential drive mechanism.

The present invention is an improvement upon the type of system illustrated in my copending application Serial No. 267,586, filed April 13, 1939, now Patent No. 2,295,327, September 8, 1942. In that application, there is shown a differential drive system comprising a feeding means for feeding a strip of material and a receiving means for receiving such strip of material, together with driving means for the feeding and receiving means which is differentially operated to maintain a slack loop of the strip between the feeding and receiving means. By maintaining the slack loop in the strip intermediate the feeding and receiving means, tensioning of the strip as it enters the receiving means is prevented. A control is provided for maintaining substantially constant the length of the slack loop between the feeding and receiving means. Such control is responsive upon movement of the loop to one of two limiting positions to regulate the operation of the differential driving means so as to maintain the loop between such two positions. Upon movement of the loop to one of its limiting positions, the control first functions to effect a regulation of the differential drive in a given direction to move the loop away from such position, and thereafter automatically functions to effect a regulation in an opposite direction to return the differential drive to substantially its position prior to operation of the control means. The first control operation in regulating the differential drive mechanism will be hereafter referred to as the "initiating cycle," and the second control operation will be referred to as the "restoring cycle." A dashpot and spring arrangement is provided in such manner that the restoring cycle may be made substantially equal in time to the initiating cycle, or may be made slightly less in time with respect to the initiating cycle. As pointed out in the said application, the regulation of the restoring cycle with respect to the initiating cycle from the standpoint of time provides an effective anti-hunting form of control for maintaining constant the length of the slack loop.

One of the principal objects of this invention is to provide an improved form of control for a differential drive by which the restoring cycle may be readily varied with respect to the initiating cycle.

A further object of this invention is to provide an improved form of control for a differential drive by which the restoring cycle is diminished in relation to the initiating cycle as the initiating cycle becomes longer.

A further object is to provide an electronic control for regulating the operation of a differential drive.

A further object is to provide a control for a differential drive which includes an electronic timer which functions to time the correcting regulation of the drive in a given direction, and thereafter functions to effect a regulation of the drive in an opposite direction for a time which is dependent upon the length of time of the first regulation.

A further object of this invention is to provide an electronic differential timer which is operable to time the length of a regulating action, and thereafter function to give a desired regulation which is dependent upon the length of time of the first regulation.

Other objects and advantages of this invention will become apparent from a study of the following description and accompanying drawings, in which:

Figure 1 is a diagrammatic view illustrating a differential drive and an electronic control for regulating the operation of such drive in accordance with the principles of this invention; and Figs. 2, 3, and 4, 5, respectively, are curves showing the operating characteristics of parts of the electronic control circuit.

In the drawings, the numeral 1 designates, as a whole, a differential drive for delivering a strip of material 2 from a feeding roll 3 to a receiving roll 4 in such manner as to maintain a slack loop 5 intermediate the feeding roll 3 and the receiving roll 4. The present invention deals with a control for correlating the speed of the feeding roll 3 with respect to the speed of the receiving roll 4 so as to maintain substantially constant the length of the strip 5 intermediate the rolls 3 and 4. The particular form of drive means per se forms no part of this invention, and this invention is adaptable for use with any differential drive which is to be regulated to maintain an object, such as the strip 5, between predetermined limit positions. Other arrangements of differential drives to which this invention is applicable may be found in Patent No. 2,011,653 to Rufsvold and Patent No. 2,147,467 to Stephenson.

The rolls 3 and 4, respectively, are driven by motors 6 and 7 having windings 8 and 9 energized from buses 10, 11, and 12. Energization of the buses 10, 11, and 12 is controlled by a switch 13 which is operated by a relay 14 and a switch 15. The feeding roll 3 is driven from the motor 6 through a variable transmission of the Reeves drive type. This transmission comprises cone-type pulleys 16 and 17 connected by belting 18, and the speed of the feeding roll 3 may be varied by adjusting vertically the position of the belt 18 through an adjusting bracket member 19. Adjustment of the bracket 19 is had through rotation of a member 20 by a belt 21 and pulley 22 operated by a motor 23. The motor 23 is illustrated as of the single phase capacity type consisting of a squirrel-cage rotor with a starting winding 24, a running winding 25, a capacitor 26, and a centrifugal starting switch 27. The motor 23 is operated in reverse directions in a manner described to adjust the position of the belt 18, and thereby vary the speed of the feed roll 3.

The upper and lower positions of the lowermost portion of the loop 5 and thereby the length of the loop 5 are controlled by suitable radiation responsive devices, such as the photoelectric cells 28 and 29. Upon movement of the loop to a position beyond its upper limit position, the cell 28 will be energized to operate relay 30 to effect a control action in a manner to be described. Upon movement of the loop to a position below its lower limit position, the cell 29 will be deenergized to operate relay 31 to effect a like regulation of the speed of the feed roll 3.

Relays 40, 50, and 60 are provided for controlling the operation and direction of rotation of the motor 23 through its starting windings 24 and 25. These relays are sequentially operated by either of the relays 30 and 31 and an electronic timer, indicated as a whole by the numeral 70 associated with the relay 31, and an electronic timer, indicated as a whole by the numeral 70a, associated with the relay 30. The construction and arrangement of both relays 70 and 70a is the same, and in the interest of simplicity, only one of these relays has been illustrated diagrammatically. Operation of the electronic control 70 is tied in with operation of the relay 31 through control leads 32, 33, 34, and 35. Initial operation of the control 70 is had upon closure of a contactor 36 which is operated by the relay 31. Operation of the relay 31 also closes a contactor 37 to operate the relay 40. The relay 30 is provided with parts similar to the parts 32 through 37, and such parts have been designated by like numerals with the suffix a added thereto. Closure of contactor 37a first operates relay 50 in the same manner that contactor 37 operates relay 40. Relays 40 and 50 are provided with identical parts and function to reverse the connections to the starting winding 24.

The relay 40 is provided with contactors 41 through 48. The relay 50 is likewise provided with contactors 51 through 58. It is to be noted that like contactors 47 and 57 and 44 and 54 are in their closed positions when the relays 40 and 50 are deenergized.

The relay 60 is provided with contactors 61 through 64. Upon operation of the switch 15 to energize the relay 14 and close the switch 13, the buses 10, 11, and 12 are energized to set into operation the motors 6 and 7. Upon energization of the buses 10, 11, and 12, a circuit is completed through the relay 60 from the bus 10 through centrifugal switch 27 to the bus 11. Energization of the relay 60 functions to close contactors 61 through 64.

The operation of the parts thus far described is as follows: Assuming that the differential driving mechanism is operating so as to lengthen the loop 5, the bottom portion thereof will deenergize the photoelectric cell 29 and likewise the relay 31 to cause contactor 37 to close. It will be recalled that relay 60 is normally energized, and that contacts 61 through 64 are normally closed. As contact 37 closes, a circuit will be completed from bus 11 through contact 37, relay coil 40, contact 54, contact 64 to bus 10. Energization of relay 40 in this manner moves contacts 41, 42, 43, 45, 46 and 48 to their closed positions. Closure of contact 41 completes a circuit from bus 11 through contact 62, contact 41, starting winding 24, contact 43, and contact 61 to bus 10. At the same time, contact 42 completes a circuit through running winding 25. After the motor 23 has started, centrifugal switch 27 will operate to deenergize relay 60 and permit movement of contacts 61 through 64 to their open position. This action does not interfere with the energization of relay 40, since movement of contact 45 to closed position completes a holding circuit for this relay.

Motor 23 is now operating in such manner as to slow down rotation of the feed roll 3 and will continue to rotate until the loop is returned to a position above the photoelectric cell 29. Upon reenergization of the photoelectric cell 29, relay 31 is energized, and contact 37 is moved to its open position. This action deenergizes relay 40 and breaks the field circuits for the motor 23, thus stopping operation of the motor 23.

Stopping the motor 23 ends the initiating cycle in which the differential drive is regulated in one direction to restore the loop to a position lying within its limit positions. The length of the initiating cycle may be either a function of the time during which the motor 23 is operated or the distance which the bracket 19 and belt 18 are moved to bring about the desired regulation. The time of operation of the motor 23 and distance of movement of the bracket 19 and belt 18 are linear.

After completion of the initiating cycle, measured by the time between the energization and deenergization of the relay 40, a change in the condition of the differential drive will have been had. Unless the differential drive is immediately regulated in an opposite direction, the loop 5 will continue to shorten, and in a short time will rise above its upper limit position, as determined by the photoelectric cell 28. To prevent this action from taking place, the electronic timer 70 functions after reenergization of the relay 31 to energize the relay 50 and operate the motor 23 in a reverse direction. The structure and operation of the timer 70 will be referred to later.

Considering now the requirements of the timer 70, it is necessary to take into consideration three possible conditions of the differential drive. Assuming first that the differential drive for the feed roll 3 is only slightly out of step, comparatively few turns of the regulating element 20 will be required to correct such condition by regulating the differential drive in a given direction and no restoring cycle is required. As the out-of-step condition of the differential drive as represented by the speed of the feed roll 3 increases, it is necessary to correspondingly increase the regulation of the differential drive in such given direction. A second condition is thus approached where it is necessary to provide a restoring cycle for regulating the differential drive in an opposite direction to prevent hunting and for this condition, the restoring cycle will be increased as the initiating cycle becomes longer and if the restoring cycle equals the initiating cycle. As the out-of-step condition of the differential drive increases still more, a longer correction in the given direction is required. In this latter case, a restoring cycle is again required in the opposite direction to prevent hunting. However, in the latter case, the restoring cycle should be diminished in point of time with respect to the initiating cycle. In other words, no restoring correction may be needed up to a certain point, and thereafter the length of the restoring cycle should approach that of the initiating cycle in point of time to prevent hunting. After the restoring cycle equals that of the initiating cycle in point of time, the restoring cycle should diminish in relation to the initiating cycle as the initiating cycle becomes longer. As will become apparent, the timing devices 70 and 70a answer the foregoing requirements.

Before referring specifically to the construction of the timer 70, the manner in which this device is tied in with the parts thus far referred to will be described. As pointed out above, the leads 32 through 35 control the operation of the timer 70. It will be recalled that upon operation of the relay 31, contactor 37 is closed to actuate the relay 40 to start the motor 23, and the initiation of the regulating cycle in a given direction. Upon operation of the relay 31 to close the contactor 37, contactor 36 is moved to its closed position, and upon energization of relay 40, contactor 46 is moved to its closed position. A closed circuit is thus completed through the leads 33 and 34. The closure of the circuit through the leads 33 and 34 initiates a timing cycle which times the period during which the relay 40 is energized, and the consequent period of the initiating cycle. At the end of the initiating cycle, relay 31 is energized to deenergize relay 40. This action moves contacts 36 and 46 to their opening positions, thus interrupting the timing circuit 33—34. As contact 46 moves to its open position, contact 47 moves to its closed position to complete a control circuit through leads 34—35. Upon connection of the leads 34—35, the timer 70 is caused to operate and send a current through the control lead 32 to energize the relay 50 through such relay, contact 44, and contact 46. Energization of the relay 50 completes a circuit in a reverse direction through the starting winding 24 to effect regulation of the differential drive in an opposite direction. The timer 70 operates to time the flow of current through the lead 32, and at the end of such time will deenergize relay 50 to stop the motor 23 and end the restoring cycle.

*Timing Mechanism*

The essential parts of the timing mechanism 70 comprise an operating transformer having a primary 71 and secondaries 72 through 77 together with a pentode tube 80, a triode tube 90, a timing capacitor 100, discharge resistance 110, and relay 120. The pentode 80 and triode 90 give a two-stage amplification for operating the relay 120. The pentode 80 is provided with anode 81, screen grid 82, control grid 83, suppresser grid 84, cathode 85, and heater 86. The triode 90 is provided with an anode 91, grid 92, cathode 93, and heater 94. The heaters 86 and 94 are energized from the secondary 76. Secondaries 73, 74, and 75 make up the anode supply for the pentode 80. The secondary 75 energizes the screen 84 of the pentode 80 and the secondary 72 energizes the anode 91 of triode 90.

The remaining secondary 77 energizes a copper-oxide rectifier 101 which is employed to provide a direct-current source for charging the timing capacitor 100. Upon closure of the timing control circuit through the leads 33 and 34, as explained above, the capacitor 100 will be connected across the output of the rectifier 101 in series with the charging resistor 102. The charging of the capacitor 100 will take place during the entire time that the relay 31 is operated by the slack loop 5. Upon interruption of the control circuit through the leads 33 and 34, the leads 34 and 35 will be connected by closure of the contact 47, and the capacitor 100 will discharge to effect a control of the relay 120 through the tubes 80 and 90. The charging time of the capacitor 100 is substantially linear with respect to its discharging time.

With the controls in the position illustrated, the discharge resistor 110 connects grid 83 to cathode 85, and thus applies a zero bias to the grid of this tube. Under this condition, the current from the anode flowing through the anode coupling resistor 96 to transformer windings 73, 74, and 75 is a maximum. Triode 90 is coupled to the pentode by grid coupling resistor 95 and the potentiometer resistor 78. The voltage across resistor 96 is applied to the grid 92 except as opposed by the fixed voltage occurring across the potentiometer arm 79 from the transformer winding 73. In this manner, grid 92 is negatively biased at its maximum value when the current from the anode 81 is a maximum. Under this condition, the current through anode 91 is a minimum, and relay coil 120 is deenergized.

Upon connection of the leads 34 and 35 by closure of the contact 47, the charged voltage across the capacitor 100 is connected across the discharge resistor 110 with the negative terminal of the capacitor connected to the grid 83. The negative bias across the pentode 80 immediately reduces its current from the anode 81 to a minimum value, thereby reducing the current through the resistor 96. The instantaneous polarity between transformer winding 73 and winding 72 is such that the end of transformer winding 73 is positive with respect to the potentiometer terminal 79 at the same instant winding 72 is positive with respect to the anode 91 of triode 90. The positive voltage appearing across potentiometer resistor 78 is then applied to grid 92, and when the voltage appearing across resistor 96 is a minimum, the grid 92 is biased positive. Grid resistor 95 is included to limit the maximum flow of grid current, while the triode 90 is biased positive. The current from the anode 91 then becomes a maximum to energize relay coil 120.

Energization of relay 120 closes contact 121 to complete the circuit through control lead 32 to energize relay 50 and effect the aforementioned reversing action of the motor 23 which constitutes the restoring cycle.

Capacitor 100, as pointed out above, discharges through resistor 110 to reduce the negative bias across pentode 80. When the capacitor becomes sufficiently discharged, the current from anode 81 increases, thus increasing the voltage drop across the resistor 96, and swings the grid bias of triode 90 toward negative. This reduces the current from the anode 91, and at some predetermined value of such current, the relay 120 is deenergized, opening contact 121 to deenergize relay 50 for the purpose of stopping the reversing regulation or restoring cycle of the control.

Upon energization of relay 120, contact 122 is closed to complete a circuit through relay 123 to close contacts 124 and 125. Upon deenergization of relay 120, contact 122 opens, but relay 123 remains energized due to the holding circuit established by closure of the contact 124.

Upon deenergization of relay 120, contacts 126 and 127 close. A low value resistor 128 is then connected across capacitor 100 through contact 125, contact 127, and back to the cathode return circuit 129 through cathode 85 of pentode 80. The resistor 128 immediately discharges capacitor 100 to dissipate any residual charge which might be retained therein, and which would otherwise cumulate and interfere with subsequent time charging actions.

Contact 126 of relay 120 is operative to connect thermal glow switch 130 across relay coil 123. The thermal glow switch 130 is of a type recently developed and comprises a pair of contacts, one of which is carried by a bimetal 131. Upon connection of the glow switch 130 to a source of current, a glow discharge takes place between the contacts, and the current flowing through the bimetal 131 heats such bimetal and causes the contacts to be moved together. Upon movement of the contacts of glow switch 130 together, the coil 123 is deenergized by short-circuiting such coil through the glow switch 130. The low value resistor 128 is then disconnected by the opening of the contacts 125 of the relay 123, and the complete equipment is ready for its next operating cycle.

Upon energization of relay 40 in response to the loop 5 deenergizing the photoelectric cell 29 and relay 31, contact 48 closes to connect resistor 132 between the ground terminal 129 and lead 35 of the electronic control circuit. Lead 35 thus connects resistor 132 in parallel with the discharge resistor 110 and also connects grid 83 of the pentode 80 to its cathode 85 through the low value resistor 132. In practice the resistor 132 and contact 48 may be located some distance away from the control 70 and thereby necessitate a rather long lead 35. A long lead 35 will have a relatively large capacitance to the ground terminal 129 adjacent the resistor 132 and during the charging interval at which time the contact 47 is open, the capacitance of the lead wire 35 will be charged by grid 83 of pentode 80 unless the circuit is shunted by a relatively low bypass resistor. Resistor 132 performs this function and causes grid 83 to be maintained at approximately zero bias during the charging interval. Resistor 133 performs this same function in connection with the lead wire 35a associated with the control 70a.

Operation

An understanding of the complete operation of the apparatus of this invention will be simplified if the operation of the various parts of the apparatus is examined in their sequential order of operation. Assuming that the loop 5 has descended to a position deenergizing the photoelectric cell 29, the first action that takes place is the deenergization of relay 31 and closure of contacts 36 and 37. Closure of contact 37 first operates relay 40 to establish rotation of motor 23 in the desired direction. Relay 60 then cuts out to deenergize starting winding 24. As relay 40 is energized contact 46 moves to its closed position and with contact 36 in its closed position rectifier 101 becomes operative to charge capacitor 100.

The next control action that takes place is the movement of the loop 5 upwardly to a position in which the photoelectric cell again becomes active to energize relay 31 and open contacts 36 and 37. Opening of contact 37 deenergizes relay 40 and breaks the circuit through running winding 25 to stop motor 23. As relay 31 is energized contact 36 is opened to stop the charging of capacitor 100. As relay 40 is deenergized contact 47 moves to closed position to complete the discharge control circuit through leads 34 and 35. As pointed out heretofore, the completion of the discharge control circuit through leads 34 and 35 changes the biases on pentode 80 and triode 90 to cause relay 120 to operate and close contact 121. Closing of contact 121 completes a circuit through lead wire 32 to relay 50. Energization of relay 50 energizes first starting winding 24 in a direction to reverse the rotation of motor 23 for the restoring cycle or adjustment of the differential drive 1 in a direction opposite to that which is had upon energization of relay 40. After capacitor 100 has discharged sufficiently the grid bias on the pentode 80 and triode 90 will change so that the output of the triode 90 will be insufficient to energize relay 120. Deenergization of the relay 120 breaks the circuit through the lead wire 32 and deenergizes relay 50 to stop the restoring cycle adjustment by stopping rotation of the motor 23. Relay 60, thermal glow switch 130, and discharge resistor 128 then function to discharge the remaining charge contained in capacitor 100.

When the loop 5 moves beyond its upper limit position as determined by the photoelectric cell 28, relay 30 is first operated and the sequential operation of parts is identical as described above in connection with the operation of the relay 31. The only difference is that relay 50 is first operated and the subsequent control actions are had through the control 70a which is identical with that of the control 70. Control 70a, it will be noted, operates relay 40 to effect the desired restoring cycle or adjustment of the differential drive 1, in the same manner and for the same purpose that control 70 operates relay 50.

Circuit constants and characteristics

The selected values of the charging resistor 102 and capacitor 100 are such that the increase in charge of the capacitor 100 is substantially linear with respect to time over the maximum timing range for which the equipment is designed. The tube constants are regulated in such manner that relay 120 will be energized at some predetermined value of grid voltage of the triode 90. As will become apparent, the values of the charging resistor 102 and capacitor 100 together with the selected grid operating voltages of the triode 90 and pentode 80 are all influencing factors affecting the timing action had by the electronic control 70 and 70a.

Bearing in mind that the charging voltage has a very closely linear relationship to the timing of the charging interval over the period through which the equipment is designed to operate, data taken from an installation constructed in accordance with the principles of this invention will now be referred to. The particular installation mentioned was designed for a maximum charging period or initiating cycle of 30 seconds. The curve in Fig. 2 plots the voltage accumulated by the capacitor 100 during the interval from zero to a maximum of 30 seconds, using a 6 microfarad capacitor 100, a 25 megohm charging resistor 102 and a 40 volt direct current source 101.

Figure 2:
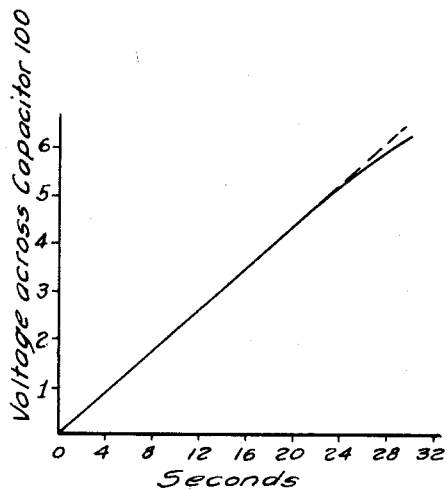

The dotted line in Fig. 2 illustrates the voltage required to obtain an exactly linear relationship between voltage and charging time. The degree of departure between the actual curve and the dotted line represents approximately the maximum departure from a linear curve that can be tolerated in order to obtain good timing operation of the equipment.

It will be noted that any combination of devices that maintain the relationship:

$$RC = 5.0t$$

where $t$ equals the maximum period for which the equipment is designed, while R is the resistance of the charging resistor and C the capacitance of the capacitor, will produce the same voltage-time relation as illustrated in Fig. 2.

Figure 3:
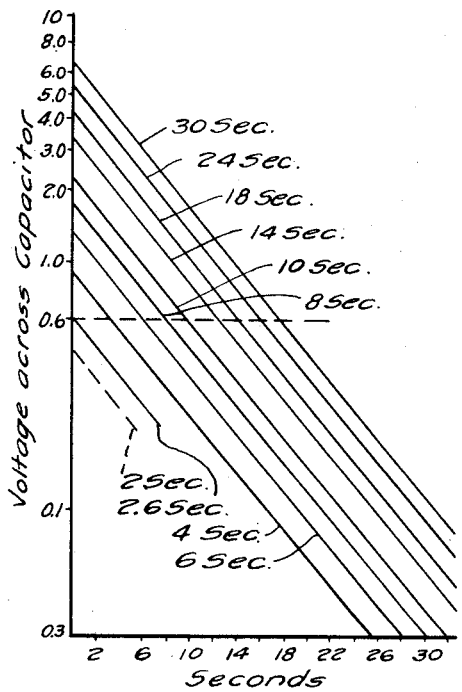

The curve in Fig. 3 shows a group of discharge curves in which the voltage across the capacitor 100 is plotted against the discharge time in seconds. Each of these curves is marked with the time for which the capacitor has been previously charged prior to the instant at which the discharge period begins. In other words, the values of the voltage when $t$ equals zero on the curve in Fig. 3 in each case agrees with the charge voltage appearing on the curve in Fig. 2 corresponding to each charge period.

In each case amplification of the electronic relay is adjusted to operate at some differential voltage between the grid 83 and cathode 85. Referring to the curve in Fig. 3 this value is 0.6 volt illustrated by the horizontal broken line. The control contact 121 of relay 120 will move to its open position whenever the charge of the capacitor 100 decreases to .6 volt as illustrated by the horizontal broken line in Fig. 3. It will therefore be apparent that the operating voltage of the device bears an important relationship to the desired function since the use of any other voltage than .6 volt, as illustrated in Fig. 3, will materially alter the time for the capacitor to become discharged sufficiently to deenergize control relay 120.

The calculated performance of the device can be easily determined from an examination of the curve of Fig. 3. It will be noted that if the charging time is 4 seconds the voltage across the capacitor will be decreased to .6 volt in approximately 3 seconds. In other words, if the charging period is 4 seconds then the discharge period will be equal to 3 seconds. As the charging time is increased to 6 seconds it will be noted that the discharge time has been increased to approximately 6 seconds and the discharge time now substantially equals the charging time. This latter condition holds good up to approximately 10 seconds. However, it will be noted that when the charging period is increased to 14 seconds the discharge period diminishes in relation to the increase in charging period and the discharge period will be approximately equal to 12 seconds. It will further be noted that the discharge period further diminishes as the charging period increases; and at a charging period of 18 seconds the discharge time will be approximately 14 seconds; at a charging period of 24 seconds the discharge period will be 16 seconds; and at a charging period of 30 seconds the discharge period will be 18 seconds.

It is also to be noted that if the charging period or time of operation of the relays 30 and 31 is less than 2.6 seconds the voltage will insufficiently operate relay 120 and consequently no restoring cycle will be had. This condition will occur whenever the differential drive 1 is only slightly out of step and a very small adjustment is necessary to regulate the length of the loop 5. Under such condition a restoring cycle is not necessary to prevent hunting.

From the foregoing it will be apparent that the values of the capacitor 100, the discharge resistor 110 and the operating voltage all affect the results obtained. In view of these factors, the required circuit constants have been determined and are set forth below:

1. To obtain discharge time equal to the charging time—

The product of the capacitor expressed in farads and discharge resistor expressed in ohms must equal 0.78 times the timing interval for which the circuit is designed expressed in seconds.

2. To obtain a discharge time equal to 62% of the charging time—

The capacitor expressed in farads multiplied by the discharge resistor expressed in ohms must equal 0.26 times the timing interval for which the circuit is designed expressed in seconds.

3. The fixed voltage input to the electronic amplifier required to operate the control relay must be equal to the product of the capacitor expressed in farads, the discharge resistor expressed in ohms, the direct current voltage of the source to charge the capacitor, and a factor of 0.00228.

The following design constants are given in summary form:

*1. Charging circuit*

$$RC = 5.0t \text{ or more}$$

where:

R—Charging resistor 102 in ohms.
C—Capacitor 100 in farads.
$t$—Maximum time (seconds) for which timer will be used.

*2. Discharge circuit*

To obtain:

$$\frac{\text{Discharge time}}{\text{Charging time}} = 1.0$$

$$RC = 0.78t$$

To obtain:

$$\frac{\text{Discharge time}}{\text{Charging time}} = 0.62$$

$$RC = 0.26t$$

where:

R—Discharge resistor 110 in ohms.
C—Capacitor 100 in farads.
$t$—Time (seconds).

*3. Operating voltage*

Operating voltage = 0.00228 × RC × charging voltage where:

Operating voltage is 82—129 to operate relay.
R is discharge resistor 110 in ohms.
C is capacitor 100 in farads.
Charging voltage is direct current supply 101 in volts.

*4. Minimum timing*

Minimum charging time (seconds) = $0.346RC$ where:

R is discharge resistor 110 in ohms.
C is capacitor 100 in farads.

Figure 4:
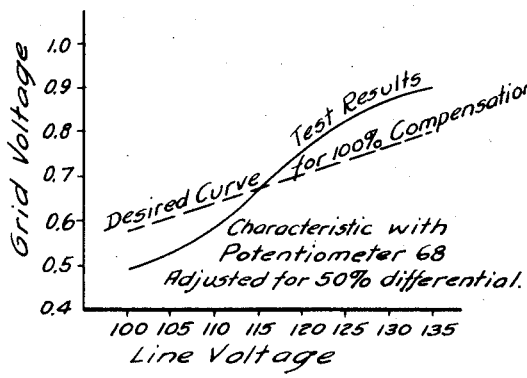
Figure 5:
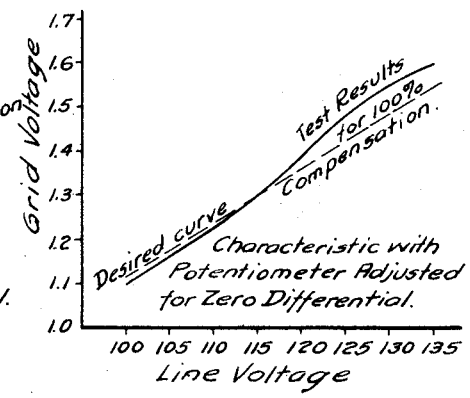

The method of changing the differential between the charging time and the discharge time is illustrated in Figs. 4 and 5. It will be noted that the coupling resistor 96 connects to the cathode 93 of triode 90 through potentiometer resistor 78. Therefore the voltage across resistor 96 is opposed by a voltage between potentiometer terminal 79 and the end of transformer winding 73. By adjusting potentiometer 79, the contacts of control relay 120 are caused to operate at an adjustable input voltage between grid 83 and cathode 85. Referring to the curve in Fig. 3, if this input voltage is increased from .6 volt to 1.1 volts it can be seen that the entire family of discharge curves will have a much shorter discharge timing interval. The value of 1.1 volts is mentioned because this particular voltage will reduce all discharge intervals approximately one-half, and such operation is referred to as "50% differential."

By use of the design constants as previously given, the circuit can be designed for any desired timing interval. The following tabulation shows a comparison between the performance as calculated, using the above circuit constant and the test results actually obtained. During the development of this circuit other values were tested both for longer and shorter periods of time, and the results obtained were very similar to the following:

Calculated performance $\begin{cases} \dfrac{\text{Discharge}}{\text{Charge}} = 1.0 \text{ at } 10 \text{ seconds} \\ \dfrac{\text{Discharge}}{\text{Charge}} = 0.62 \text{ at } 30 \text{ seconds} \end{cases}$

| Charging time (sec.) | Discharge time (sec.) | |
|---|---|---|
| | Calculated | Test |
| 3.0 | 1.4 | 2.3 |
| 4.0 | 3.0 | 3.6 |
| 5.0 | 4.8 | 5.0 |
| 6.0 | 6.0 | 6.0 |
| 8.0 | 8.0 | 8.0 |
| 10.0 | 10.0 | 10.0 |
| 14.0 | 12.4 | 12.5 |
| 15.0 | 13.0 | 13.0 |
| 20.0 | 15.2 | 16.0 |
| 24.0 | 16.4 | 17.0 |
| 30.0 | 18.0 | 19.0 |

A novel feature of the circuit and design is the compensation obtained to eliminate variation in timing with respect to variation in line voltage input. This compensation is obtained by a combination of the following design features:

1. The screen 84 of pentode 80 is energized by transformer winding 75 and it will be noted that the screen voltage will change in exact proportion to the anode voltage as determined by transformer windings 73, 74 and 75. By the proper choice of this screen operating voltage together with the fact that the screen and anode voltages change by the same percentage, the anode current 91 remain's essentially constant for any given grid input voltage 83—85 over wide variations in line voltage.

2. The direct current source to charge capacitor 100 is obtained from transformer winding 77 which changes the direct current voltage output of the rectox rectifier in proportion to the change in line input voltage. This increases or decreases the charge voltage across capacitor 100 for any particular charging time in proportion to the change in line input voltage.

3. Transformer winding 73 changes the voltage across potentiometer resistor 78 in proportion to a change in line input voltage. The voltage between potentiometer terminal 79 and the end of transformer winding 73 is connected into the circuit as has been previously described in such a way as to change the operating voltage 83—85 fed into the grid circuit of the input tube 80.

The following test results show the effect of line voltage variation over a range from 100 volts minimum to 135 volts maximum:

| Line volts | Charge time (sec.) | Discharge time (sec.) |
|---|---|---|
| 100 | 5.0 | 6.0 |
| 100 | 10.0 | 11.5 |
| 100 | 30.0 | 20.0 |
| 105 | 5.0 | 5.3 |
| 105 | 10.0 | 10.3 |
| 105 | 30.0 | 19.5 |
| 110 | 5.0 | 5.0 |
| 110 | 10.0 | 10.0 |
| 110 | 30.0 | 19.0 |
| 115 | 5.0 | 5.0 |
| 115 | 10.0 | 10.0 |
| 115 | 30.0 | 19.0 |
| 125 | 5.0 | 4.8 |
| 125 | 10.0 | 9.7 |
| 125 | 30.0 | 18.5 |
| 135 | 5.0 | 4.7 |
| 135 | 10.0 | 9.5 |
| 135 | 30.0 | 18.2 |

Since certain changes may be made in the above described construction and different embodiments of the invention may be made without departing from the scope thereof, it is intended that all matter contained in the above description or shown in the accompanying drawings shall be interpreted as illustrative and not in a limiting sense.

I claim as my invention:

1. A control system comprising, in combination, means for delivering material, means for receiving material, differential driving means for maintaining the speeds of said delivering and receiving means so related that a slack loop of material is maintained therebetween, limit means responsive to a change in the position of said slack loop for regulating the speed of said differential means in a given direction, the extent of said regulation being dependent upon the change in said position, and timing means for thereafter regulating the speed of said differential means varying amounts in an opposite direction to prevent hunting, said timing means including a device for measuring the amount of said first regulation and electric control means connected to said device for varying the proportion of said subsequent regulations relative to said first regulation dependent on the measured amount of said first regulation.

2. A control system comprising, in combination, means for delivering material, means for receiving material, differential driving means for maintaining the speeds of said delivering and receiving means so related that a slack loop of material is maintained therebetween, limit means responsive to a change in the position of said slack loop for regulating the speed of said differential means in a given direction, the amount of said regulation being dependent upon the extent of said change in position, and timing means for thereafter regulating the speed of said differential means in the opposite direction to prevent hunting, said timing means including a device for measuring said amount of said first regulation and circuit means connected to said device so as to be controlled thereby in a given dependence upon said measured amount so as to control said subsequent regulation to substantially equal said first regulation up to a given change of said position and to be smaller at larger changes of said position.

3. A control system comprising, in combination, means for delivering material, means for receiving material, differential driving means for maintaining the speeds of said delivering and receiving means so related that a slack loop of material is maintained therebetween, limit means responsive to a change in the position of said slack loop for initially regulating the speed of said differential means in a given direction, and timing means for subsequently regulating said differential means in an opposite direction to prevent hunting, said timing means including a capacitor controlled by said limit means to vary its capacitive charge in accordance with the amount of said first regulation and electronic means for controlling said subsequent regulation in dependence upon said amount so as to increase said subsequent regulation as said initial regulation increases until said regulations are equal and to diminish said subsequent regulation as said initial regulation further increases.

4. A control system comprising, in combination, means for delivering material, means for receiving material, differential driving means for maintaining the speeds of said delivering and receiving means so related that a slack loop of material is maintained between upper and lower limit positions, a pair of relays respectively operable to speed up and slow down said differential means, means responsive to movement of said loop beyond said respective limit positions for operating one of said relays to return said loop to within said limit positions, and a timer comprising an electronic control device and a capacitive charging circuit connected to said one relay for varying its charging condition in accordance with the operating period of said one relay, said electronic device being connected between said charging circuit and said other relay for operating said other relay for a variable period dependent upon the period of operation of said one relay.

5. A control system comprising, in combination, means for delivering material, means for receiving material, differential driving means for maintaining the speeds of said delivering and receiving means so related that a slack loop of material is maintained between upper and lower limit positions, a pair of relays respectively operable to speed up and slow down said differential means, means responsive to movement of said loop beyond said limit positions for operating one of said relays to return said loop to within said limit positions, and a timer comprising an electronic control device for operating said other relay and provided with a control grid, circuit means normally biasing said control grid so as to render said other relay inoperative, a capacitor connected to said one relay for varying its capacitive charging condition in accordance with the operating period of said one relay, means controlled by said one relay for subsequently connecting said capacitor to said circuit means for causing said control device to operate said other relay for a period dependent upon said variation of charging condition, said timer having an operating characteristic so as to render said two periods substantially equal for a given value of charging variation and to decrease said latter period in dependence upon the extent of departure of said capacitor from said given value.

6. A control system comprising, in combination, means for delivering material, means for receiving material, differential driving means for maintaining the speeds of said delivering and receiving means so related that a slack loop of material is maintained between upper and lower limit positions, a pair of relays respectively operable to speed up and slow down said differential means, means responsive to movement of said loop beyond said respective limit positions for operating one of said relays to return said loop to within said limit positions, and a timer comprising an electronic control device for operating said other relay and provided with a control grid, circuit means normally biasing said control grid so as to render said other relay inoperative, a capacitor connected to said one relay for varying its capacitive charging condition in accordance with the operating period of said one relay, means controlled by said one relay for subsequently connecting said capacitor to said circuit means for causing said control device to operate said other relay for a period dependent upon said variation of charging condition, and adjusting means included in said timer for varying its operating characteristic to thereby vary the ratio of said two periods.

7. A control system comprising, in combination, differential driving means for maintaining a regulated quantity of web material between two limit positions, a pair of relays respectively operable to speed up and slow down said differential means, control means responsive to movement of said quantity beyond said respective positions for operating one of said respective relays to return said quantity to within said limit position, and timing means disposed for thereafter operating said other relay a timed period and having means connected to said one relay for measuring the period of operation of said one relay and means controlled by said measuring means and connected to said other relay for changing the ratio of said timed period relative to said measured period in dependence upon the length of said measured period.

8. A control system comprising, in combination, differential driving means for maintaining a regulated quantity of web material between upper and lower limit positions, a pair of relays respectively operable to speed up and slow down said differential means, means responsive to movement of said quantity to without said limit positions for operating one of said relays to return said quantity to within said limit positions, and timing means disposed for thereafter operating said other relay a timed period and having an electronic device, an auxiliary relay to be operated by said device, electric circuit means connected with said device for controlling it to operate said auxiliary relay during said timed period subsequent to the operating period of said one relay, said circuit means having means for measuring said operating period and changing the ratio of said timed period to said operating period in dependence upon the measured length of said operating period, said auxiliary relay being connected to the other of said pair of relays to operate it during said subsequent timed period.

9. A control system comprising, in combination, differential driving means for maintaining a regulated quantity of traveling web material between upper and lower limit positions, a pair of relays respectively operable to speed up and slow down said differential means, means responsive to movement of said quantity beyond said limit positions for operating one of said relays to return said quantity to within said limit positions, and a timer comprising an electronic control device for operating said other relay and provided with a control grid, circuit means normally biasing said control grid so as to render said other relay inoperative, and means disposed for measuring the period of operation of said one relay and connected to said circuit means for subsequently changing the bias of said grid to render said other relay operative for another period whose ratio to said first period changes in dependence upon the measured length of said first period.

WALDEMAR I. BENDZ.